A. E. KRAUSE.
STRAINER.
APPLICATION FILED FEB. 19, 1914.
1,111,471. Patented Sept. 22, 1914.
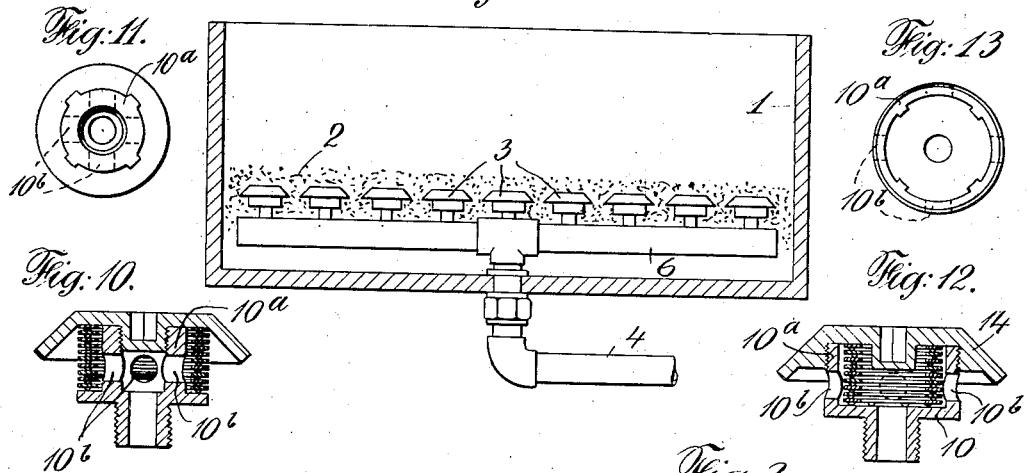
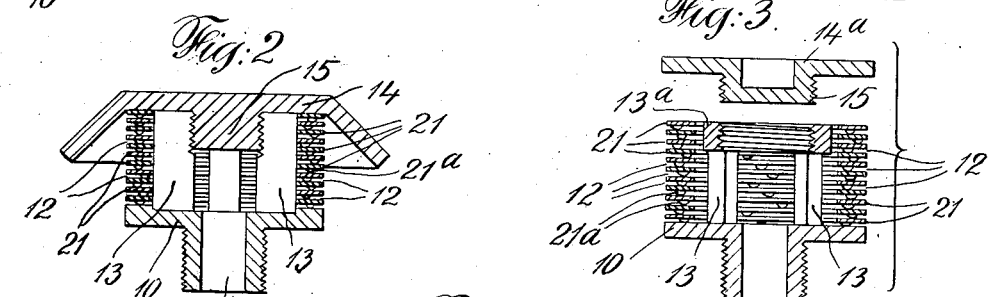
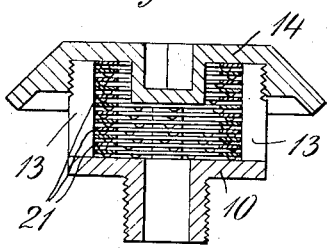
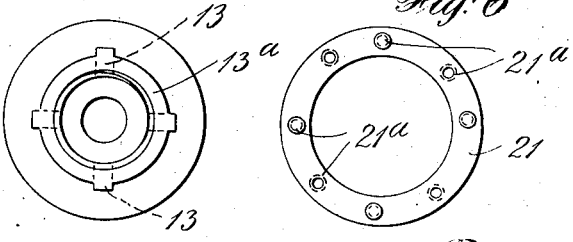
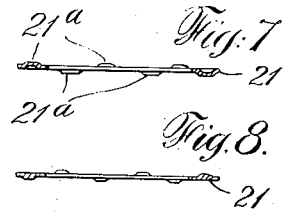
Witnesses:
Inventor
Arthur E. Krause
By his Attorneys

UNITED STATES PATENT OFFICE.

ARTHUR E. KRAUSE, OF JERSEY CITY, NEW JERSEY.

STRAINER.

1,111,471.  Specification of Letters Patent.  Patented Sept. 22, 1914.

Application filed February 19, 1914. Serial No. 819,788.

*To all whom it may concern:*

Be it known that I, ARTHUR E. KRAUSE, a citizen of the United States of America, and a resident of Jersey City, in the county of Hudson and State of New Jersey, have invented certain new and useful Improvements in Strainers, of which the following is a specification.

My invention relates to improvements in strainers, particularly strainers which are intended to exclude solid matter while permitting the free flow of water or other liquid which may carry solid matter with it. The improved strainers herein described are particularly intended for use in connection with filters employing a layer of granular material (such as sand, for example) as a filter bed. In such filters, strainers are used, not only to prevent the particles of the granular material of the filter bed from entering the clear water outlet pipe, but also for admitting washed water to the filter bed and distributing such washed water widely throughout such bed. In such filters, it has been the practice heretofore to employ a plurality of strainer heads, such heads being either connected to a series of communicating pipes under the filter bed, and leading to a common outlet pipe, or being mounted on a general discharge plate beneath the filter bed, there being beneath this discharge plate, a discharge chamber, with which the clear water discharge pipe communicates. When washing the filter bed of such a filter, the flow of water is reversed; *i. e.*, washing water is caused to flow through what is normally the clear water pipe into the strainers and thence into the filter bed, such washing water being discharged, in practice, into a suitable overflow pipe. By means of the washing water passing through the filter bed in the reverse of the direction of normal flow of water through such bed, the material of said bed is thoroughly agitated and washed, and thereby freed from impurities taken up during the filtering operation.

The strainer heads commonly used heretofore consist of metallic nozzles having saw-cuts or slots forming orifices through which the water passes, such cuts being narrow enough to prevent the particles of filtering sand from entering or passing through them with the water. Other strainer heads have been provided with a number of small holes, in lieu of the saw-cuts or slots mentioned. These former strainer heads have been so constructed, as a rule, that only a very limited area of straining surface is available, the number of straining slots or holes being therefore small, and the total cross-sectional area of such slots or holes being small, with the result that water passes through such slots or holes at a relatively high velocity; and since such water is apt to carry with it gritty matter, the slots or holes are gradually cut or widened by the action of such gritty matter, with the result that such strainers soon require renewal, or a coarser or less efficient grade of sand must be substituted. In some cases attempt has been made to reduce to a low limit the velocity of the water through the strainer holes, by the provision of a very large number of strainers; but this increases greatly the cost of the filtering apparatus.

By my invention I provide strainer heads which, even when of moderate size, have a very large effective straining area, containing a very large total cross section of straining holes or slots, the velocity of the water through which will be relatively low, therefore; and these strainer heads are of very simple construction, and moreover are provided with means for preventing the granular material of the filter bed from resting against such straining holes or slots. As a result, the cost of my strainer heads, per unit of straining area, is very much less than heretofore, the speed of the water passing through the slots is reduced, with consequent reduction of tendency of the strainers to clog, and since the granular material of the filter bed does not come into immediate contact with the straining surfaces, there is practically no action tending to cut out or enlarge the strainer slots.

My invention consists in the novel construction of the strainer head, hereinafter described.

The object of my invention is to improve strainer heads and to increase in proportion to the size of the strainer heads, the total effective straining area, and the total area of straining holes or perforations.

I will now proceed to describe my invention with reference to the accompanying drawings, and will then point out the novel features in claims.

In the drawings: Figure 1 shows a transverse section of a filter casing having within it a filter bed of granular material, and a plurality of straining heads, constructed in accordance with my invention, and mounted upon a suitable discharge pipe. Fig. 2 shows an axial section of the strainer head itself. Fig. 3 shows an axial section of the strainer head with the top removed, the top itself shown in vertical section above the body portion of the strainer head, being of an alternative type to that shown in Fig. 2. Fig. 4 shows a detail top view of the base portion of the strainer head and Fig. 5 shows a side view thereof. Fig. 6 shows a top view of one of the bossed rings of which the side walls of the strainer head are built up, and Fig. 7 shows a side view of one of such rings. Fig. 8 shows a side view of an alternative form of ring. Fig. 9 shows a longitudinal section of a strainer having the wall-rings within the ribs instead of outside of said ribs. Fig. 10 is a longitudinal section of a further alternative form of strainer; and Fig. 11 is a longitudinal section of a further alternative construction. Fig. 12 shows an axial section of a further alternative form of strainer; and Fig. 3 shows a top view of the base portion of the strainer with the top of the strainer and the strainer rings removed.

In Fig. 1, 1 designates the filter tank, 3 the strainer heads, 4 the clear water outlet pipe, and 6 a manifold connected to said pipe 4 and to which the strainer heads 3 are connected. The particular shape of the tank 1 and the particular arrangement of pipes 4 and 6 therein, and of the strainers on said pipe 6, form no portion of my invention, and may be varied as desired. An arrangement of pipes 6 and strainer heads 3 thereon should be adopted, such that the strainers are spaced as evenly as possible over the entire cross sectional area of the tank, and with the strainers at suitable distances from one another. 2 designates the granular material of the filter bed.

The strainer heads 3 comprise a body or base portion 10 having a suitable flow connection 11 and having ribs 13 projecting upwardly from, but preferably formed integrally with, the base portion 10. As indicated particularly in Figs. 3, 4 and 5 these ribs 13 may be connected, near their upper ends, by an integrally formed ring 13ª, the function of which will be referred to hereinafter; although, as indicated in Fig. 2, this ring 13ª may be omitted. The walls of the strainer are formed, in the construction shown, by a series of rings or washers 21 of such internal diameter that they fit over and are centered by the ribs 13. These rings or washers 21 are spaced apart somewhat by any suitable means, the particular means indicated, which is very convenient for the purpose, being bosses 21ª provided on the upper and lower surfaces of such rings. These rings may be formed conveniently by stamping them from sheet metal, and the said bosses may be formed in the rings by the action of the stamping dies or of other suitable dies. When the rings are assembled on the body of the strainer head, they form what is in effect an annular foraminous wall, the slots 12 provided between the rings 21 as a result of the spacing apart of those rings, constituting openings in such wall for the passage of the liquid.

The top of the strainer head is closed and the rings 21 are held in place, by means of a top plate or end piece 14 (Fig. 2) or 14ª (Fig. 3) having a screw threaded portion 15 engaging screw threads on the inner walls of the ribs 13 (Fig. 2) or on the inner wall of the ring 13ª (Figs. 3 and 4) with which ring 13ª the ribs 13 are integral as previously described. The top or end piece of the strainer head may be of hood form, as shown in Fig. 2, or may be plain, as shown in Fig. 3. The hood form shown in Fig. 2 has certain advantages, for since the hood projects well out from the body of the strainer head, the natural angle-of-repose hillocks of the filter bed, formed by these hoods, clear the straining surface of the strainers and so provide a free space, around the straining surface of the strainers for the flow of the liquid into the strainers.

The ring 13ª connecting the ribs 13 near their upper or outer ends, is not essential, but is convenient, since it reinforces these ribs 13 and therefore permits the ribs 13 to be of lighter construction than would be desirable otherwise, and also since this ring 13ª having continuous screw threads on its inner surface, is more easily engaged by the threads of the boss 15 of the end piece. In the contruction shown in Fig. 2, in which no ring 13ª connecting the ribs 13 is employed, the ribs 13 together constitute in effect a body having an interrupted screw thread; and it is sometimes difficult to engage the threads of the boss 15 of the end piece with corresponding threads of all of such ribs 13.

The bosses of the rings or washers 21 are, preferably, spaced irregularly, as indicated particularly in Fig. 6, so as to render it improbable that the bosses of one ring will be directly over the bosses of the ring beneath. It is preferable that the bosses of the rings shall have staggered relation.

While I have shown in Figs. 6 and 7, the ring 21 provided with recesses complemental to the bosses, it is preferable to form the and such a ring is shown in Fig. 8. It is rings without such complemental recesses; quite practicable to form rings with bosses and without recesses complemental to those bosses, as sufficient pressure exerted by the forming dies will cause the metal to flow so as to form bosses without complemental recesses.

As indicated in Fig. 9, the wall rings 21 may be within the ribs 13 instead of being outside of such ribs, as indicated in the preceding figures.

Instead of providing the base 10 with a plurality of upwardly projecting ribs 13, the base 10 may have a peripheral wall 10ª provided with large openings 10ᵇ; the wall rings being located around said wall 10ª, as indicated in Fig. 10, or within said wall 10ª, as indicated in Fig. 11. The wall 10ª provided with large perforations, constitutes the substantial equivalent of the ribs 13.

My improved strainer head is used in the same way that the strainer heads formerly existing have been used; but owing to the total large effective area of straining orifices provided, the velocity of the water passing through these orifices is slow; the advantages of which have been set forth heretofore.

This application is in part a continuation of my prior application for Letters Patent for improvements in strainers, filed April 29, 1913, Sr. No. 764,375 in which application I have claimed a strainer comprising a hollow body having a flow connection and having inwardly projecting portions and perforations, between such inwardly projecting portions, extending from the outer surface of said body inward; the said inward projections (represented in the constructions shown herein by the ribs 13) being screw threaded internally; and an end piece having a correspondingly screw threaded portion engaging the threads of said projections, said end piece closing the end of said body. In said prior application I have also claimed a strainer comprising a base having a flow connection and having ribs projecting therefrom, a perforate wall surrounding said ribs, and an end piece structurally separate from said base and ribs, detachably connected to said ribs and closing the wall at its end. Therefore I do not claim such features in this application.

What I claim is:—

1. A strainer such as described comprising a base provided with integral projecting ribs, a plurality of rings surrounding said ribs and centered thereby but separate therefrom and forming an annular wall, straining openings being provided in such wall, and an end piece detachably secured to such base and holding said rings in place, said base, end piece, and rings inclosing a hollow space to which a flow connection is provided in the structure.

2. A strainer such as described comprising a base provided with integral projecting ribs, a plurality of rings surrounding said ribs and centered thereby but separate therefrom and forming an annular wall, straining openings being provided in such wall, and an end piece screw connected to said ribs and holding said rings in place, said base, end piece and rings inclosing a hollow space to which a flow connection is provided in the structure.

3. A strainer such as described comprising a base provided with integral projecting ribs and with a ring connecting said ribs near the ends thereof, a plurality of rings surrounding said ribs and forming an annular wall, straining openings being provided in such wall, and an end piece screw connected to the ring connecting said ribs and holding said wall-rings in place, said base, end piece and wall rings inclosing a hollow space to which a flow connection is provided in the structure.

4. A strainer such as described comprising a base provided with integral projecting ribs, a plurality of rings surrounding said ribs and centered thereby but separate therefrom and forming an annular wall and spaced apart one from the other, whereby straining openings are provided in such walls, and an end piece detachably secured to such base and holding said rings in place, said base, end piece and rings inclosing a hollow space to which a flow connection is provided in the structure.

5. A strainer such as described comprising a base provided with integral projecting ribs, a plurality of rings surrounding said ribs and forming an annular wall and provided with bosses spacing said rings apart one from the other, whereby straining openings are provided in such wall, and an end piece detachably secured to such base and holding said rings in place, said base, end piece and rings inclosing a hollow space to which a flow connection is provided in the structure.

6. A strainer such as described comprising a base, a plurality of rings mounted thereon one above another and forming an annular wall and spaced apart one from another, whereby straining openings are provided in such wall, such rings being structurally separate from the base, said base provided with integral ribs for centering said rings, and an end piece secured to such ribs and holding said rings in place, said base, end piece and rings inclosing a hollow space to which a flow connection is provided in the structure.

In testimony whereof I have signed this specification in the presence of two subscribing witnesses.

ARTHUR E. KRAUSE.

Witnesses:
H. M. MARBLE,
D. A. DAVIES.